(12) United States Patent
Karczewicz et al.

(10) Patent No.: US 10,887,604 B2
(45) Date of Patent: *Jan. 5, 2021

(54) SIGNALLING OF FILTERING INFORMATION

(71) Applicant: QUALCOMM Incorporated, San Diego, CA (US)

(72) Inventors: Marta Karczewicz, San Diego, CA (US); Li Zhang, San Diego, CA (US); Wei-Jung Chien, San Diego, CA (US)

(73) Assignee: QUALCOMM Incorporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,955

(22) Filed: Jul. 29, 2019

(65) Prior Publication Data

US 2019/0349590 A1   Nov. 14, 2019

Related U.S. Application Data

(63) Continuation of application No. 15/589,773, filed on May 8, 2017, now Pat. No. 10,382,766.

(Continued)

(51) Int. Cl.
*H04N 19/159* (2014.01)
*H04N 19/117* (2014.01)
(Continued)

(52) U.S. Cl.
CPC ......... *H04N 19/159* (2014.11); *H04N 19/105* (2014.11); *H04N 19/107* (2014.11);
(Continued)

(58) Field of Classification Search
CPC .... H04N 19/159; H04N 19/80; H04N 19/174; H04N 19/463; H04N 19/196;
(Continued)

(56) References Cited

U.S. PATENT DOCUMENTS

| 8,982,960 B2 | 3/2015 | Chong et al. |
| 9,258,563 B2 | 2/2016 | Chong et al. |

(Continued)

FOREIGN PATENT DOCUMENTS

| EP | 1720358 A2 | 11/2006 |
| WO | 2006108654 A2 | 10/2006 |

OTHER PUBLICATIONS

Algorithm Description of Joint Exploration Test Model 1 (JEM1), 113. MPEG Meeting, Oct. 19, 2015-Oct. 23, 2015, Geneva, (Motion Picture Expert Group or ISO/IEC JTC1/SC29/WG11), No. N15790, Dec. 11, 2015 (Dec. 11, 2015), XP030022473.

(Continued)

*Primary Examiner* — Tracy Y. Li
(74) *Attorney, Agent, or Firm* — Shumaker & Sieffert, P.A.

(57) ABSTRACT

A video decoder is configured to, for a group of video blocks of the video data, determine a number of merged groups for a plurality of classes is equal to one merged group; receive a first flag indicating that filter coefficient information for at least one merged group is not coded in the video data; receive for the one merged group, a second flag, wherein a first value for the second flag indicates that filter coefficient information mapped to the one merged group is coded in the video data, and wherein a second value for the second flag indicates that the filter coefficient information mapped to the one merged group is all zero values; determine the second flag is equal to the second value; and determine one or more filters from the set of filters using the all zero values.

20 Claims, 9 Drawing Sheets

Related U.S. Application Data

(60) Provisional application No. 62/333,783, filed on May 9, 2016.

(51) Int. Cl.

| | | |
|---|---|---|
| *H04N 19/105* | (2014.01) | |
| *H04N 19/107* | (2014.01) | |
| *H04N 19/187* | (2014.01) | |
| *H04N 19/176* | (2014.01) | |
| *H04N 19/196* | (2014.01) | |
| *H04N 19/463* | (2014.01) | |
| *H04N 19/174* | (2014.01) | |
| *H04N 19/80* | (2014.01) | |
| *H04N 19/10* | (2014.01) | |
| *H04N 19/70* | (2014.01) | |
| *H04N 19/60* | (2014.01) | |
| *H04N 19/61* | (2014.01) | |

(52) U.S. Cl.
CPC ......... *H04N 19/117* (2014.11); *H04N 19/174* (2014.11); *H04N 19/176* (2014.11); *H04N 19/187* (2014.11); *H04N 19/196* (2014.11); *H04N 19/463* (2014.11); *H04N 19/80* (2014.11); *H04N 19/10* (2014.11); *H04N 19/60* (2014.11); *H04N 19/61* (2014.11); *H04N 19/70* (2014.11)

(58) Field of Classification Search
CPC .. H04N 19/176; H04N 19/187; H04N 19/107; H04N 19/105; H04N 19/117; H04N 19/61; H04N 19/60; H04N 19/70; H04N 19/10
See application file for complete search history.

(56) References Cited

U.S. PATENT DOCUMENTS

| | | | |
|---|---|---|---|
| 10,382,766 B2 | 8/2019 | Karczewicz et al. | |
| 2012/0051425 A1* | 3/2012 | Chong | H04N 19/82 375/240.12 |
| 2012/0243611 A1 | 9/2012 | Kondo | |
| 2013/0170542 A1* | 7/2013 | Sato | H04N 19/82 375/240.02 |
| 2013/0266058 A1* | 10/2013 | Minoo | H04N 19/196 375/240.02 |
| 2013/0266059 A1* | 10/2013 | Chong | H04N 19/169 375/240.02 |
| 2013/0294524 A1* | 11/2013 | Van Der Auwera | H04N 19/70 375/240.18 |
| 2014/0044161 A1 | 2/2014 | Chen et al. | |
| 2015/0365703 A1* | 12/2015 | Puri | H04N 19/17 375/240.24 |

OTHER PUBLICATIONS

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, Ch 14—Jan. 23, 2013, JCTVC-L1100, 4 Pages.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pages.

International Search Report and Written Opinion—PCT/US2017/031767—ISA/EPO—dated Jul. 6, 2017.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/., No. JVET-B0060, 6 pages.

"Golomb coding," accessed from https://en.wikipedia.org/wiki/Golomb_coding, accessed on May 9, 2016, 8 pp.

Response to Written Opinion dated Jul. 6, 2017 from International Application No. PCT/US2017/031767, filed on Mar. 7, 2018, 20 pp.

Second Written Opinion issued in International Application No. PCT/US2017/031767, dated Apr. 10, 2018, 8 pp.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Wiegand, T., et al., "WD3: Working Draft 3 of High-Efficiency Video Coding", Joint Collaborative Team on Video Coding (JCT-VC) of ITU-T SG16 WP3 and ISO/IEC JTC1/SC29/WG11, Document JCTVC-E603_d1, 5th Meeting: Geneva, CH, Mar. 16-23, 2011, 167 Pages.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Bossen et al., "HM Software Manual," Joint Collaborative Team on Video Coding (JCT-VC) of ITU-T SG16 WP3 and ISO/IEC JTC1/SC29/WG11, JCTVC-Software Manual, Jun. 18, 2015, 27 pp.

* cited by examiner

SIGNALLING OF FILTERING INFORMATION

This application is a continuation of U.S. patent application Ser. No. 15/589,773, filed 8 May 2017, which claims the benefit of U.S. Provisional Application No. 62/333,783, filed 9 May 2016, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to the filtering of video data. The techniques of this disclosure may, for example, be used for adaptive loop filtering or other types of loop filtering.

According to one example, a method for decoding video data includes, for a group of video blocks of the video data, determining a number of merged groups for a plurality of classes, wherein each class of the plurality of classes has corresponding values for metrics, wherein each class of the plurality of classes is mapped to a filter from a set of filters, and wherein each merged group comprises one or more classes that are mapped to same filter coefficient information; determining the number of merged groups for the plurality of classes is equal to one, indicating that the plurality of classes includes one merged group; receiving, in the video data, for the group of video blocks, a first flag, wherein a first value for the first flag indicates that filter coefficient information for at least one of the merged groups is not coded in the video data and a second value for the first flag indicates that filter coefficient information for all of the merged groups is coded in the video data; determining that the first flag is equal to the first value; receiving, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values; determining the second flag is equal to the second value; and determining one or more filters from the set of filters using the all zero values.

According to another example, a method for encoding video data includes determining a set of filters for a group of video blocks of the video data; determining sets of filter coefficient information for the group of video blocks; determining a number of merged groups for a plurality of classes, wherein each class of the plurality of classes has corresponding values for metrics, wherein each class of the plurality of classes is mapped to a filter from the set of filters, and wherein each merged group comprises one or more classes that are mapped to a same set of filter coefficient information; determining the number of merged groups for the plurality of classes is equal to one, indicating that the plurality of classes includes one merged group; generating, for inclusion in the video data, a first flag set to a first value, wherein the first value for the first flag indicates that filter coefficient information for at least one of the merged groups is not coded in the video data and a second value for the first flag indicates that filter coefficient information for all of the merged groups is coded in the video data; generating, for inclusion in the video data, a second flag set to a second value, wherein a first value for the second flag indicates that filter coefficient information mapped to the one merged group is coded in the video data, and wherein the second value for the second flag indicates that the filter coefficient information mapped to the one merged group is all zero values.

According to another example, a device for decoding video data includes a memory configured to store the video data; and one or more processors configured to, for a group of video blocks of the video data, determine a number of merged groups for a plurality of classes, wherein each class of the plurality of classes has corresponding values for metrics, wherein each class of the plurality of classes is mapped to a filter from a set of filters, and wherein each merged group comprises one or more classes that are mapped to same filter coefficient information; determine the number of merged groups for the plurality of classes is equal to one, indicating that the plurality of classes includes one merged group; receive, in the video data, for the group of video blocks, a first flag, wherein a first value for the first flag indicates that filter coefficient information for at least one of the merged groups is not coded in the video data and a second value for the first flag indicates that filter coefficient information for all of the merged groups is coded in the video data; determine that the first flag is equal to the first value; receive, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values; determine the second flag is equal to the second value; and determine one or more filters from the set of filters using the all zero values.

According to another example, a device for encoding video data includes a memory configured to store video data and one or more processors configured to determine a set of filters for a group of video blocks of the video data; determine sets of filter coefficient information for the group of video blocks; determine a number of merged groups for a plurality of classes, wherein each class of the plurality of classes has corresponding values for metrics, wherein each class of the plurality of classes is mapped to a filter from the set of filters, and wherein each merged group comprises one or more classes that are mapped to a same set of filter coefficient information; determine the number of merged groups for the plurality of classes is equal to one, indicating that the plurality of classes includes one merged group; generate, for inclusion in the video data, a first flag set to a first value, wherein the first value for the first flag indicates that filter coefficient information for at least one of the merged groups is not coded in the video data and a second value for the first flag indicates that filter coefficient information for all of the merged groups is coded in the video data; and generate, for inclusion in the video data, a second flag set to a second value, wherein a first value for the second flag indicates that filter coefficient information mapped to the one merged group is coded in the video data, and wherein the second value for the second flag indicates that the filter coefficient information mapped to the one merged group is all zero values.

According to another example, a device for decoding video data includes means for determining a number of merged groups for a plurality of classes for a group of video blocks of the video data, wherein each class of the plurality of classes has corresponding values for metrics, wherein each class of the plurality of classes is mapped to a filter from a set of filters, and wherein each merged group comprises one or more classes that are mapped to same filter coefficient information; means for determining the number of merged groups for the plurality of classes is equal to one, indicating that the plurality of classes includes one merged group; means for receiving, in the video data, for the group of video blocks, a first flag, wherein a first value for the first flag indicates that filter coefficient information for at least one of the merged groups is not coded in the video data and a second value for the first flag indicates that filter coefficient information for all of the merged groups is coded in the video data; means for determining that the first flag is equal to the first value; means for receiving, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values; means for determining the second flag is equal to the second value; and means for determining one or more filters from the set of filters using the all zero values.

According to another example, a device for encoding video data includes means for determining a set of filters for a group of video blocks of the video data; means for determining sets of filter coefficient information for the group of video blocks; means for determining a number of merged groups for a plurality of classes, wherein each class of the plurality of classes has corresponding values for metrics, wherein each class of the plurality of classes is mapped to a filter from the set of filters, and wherein each merged group comprises one or more classes that are mapped to a same set of filter coefficient information; means for determining the number of merged groups for the plurality of classes is equal to one, indicating that the plurality of classes includes one merged group; means for generating, for inclusion in the video data, a first flag set to a first value, wherein the first value for the first flag indicates that filter coefficient information for at least one of the merged groups is not coded in the video data and a second value for the first flag indicates that filter coefficient information for all of the merged groups is coded in the video data; and means for generating, for inclusion in the video data, a second flag set to a second value, wherein a first value for the second flag indicates that filter coefficient information mapped to the one merged group is coded in the video data, and wherein the second value for the second flag indicates that the filter coefficient information mapped to the one merged group is all zero values.

According to another example, a computer readable storage medium stores instructions that, when executed by one or more processors, cause the one or more processors to, for a group of video blocks of the video data, determine a number of merged groups for a plurality of classes, wherein each class of the plurality of classes has corresponding values for metrics, wherein each class of the plurality of classes is mapped to a filter from a set of filters, and wherein each merged group comprises one or more classes that are mapped to same filter coefficient information; determine the number of merged groups for the plurality of classes is equal to one, indicating that the plurality of classes includes one merged group; receive, in the video data, for the group of video blocks, a first flag, wherein a first value for the first flag indicates that filter coefficient information for at least one of the merged groups is not coded in the video data and a second value for the first flag indicates that filter coefficient information for all of the merged groups is coded in the video data; determine that the first flag is equal to the first value; receive, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values; determine the second flag is equal to the second value; and determine one or more filters from the set of filters using the all zero values.

According to another example, a computer readable storage medium stores instructions that, when executed by one or more processors, cause the one or more processors to determine a set of filters for a group of video blocks of the video data; determine sets of filter coefficient information for the group of video blocks; determine a number of merged groups for a plurality of classes, wherein each class of the plurality of classes has corresponding values for metrics, wherein each class of the plurality of classes is mapped to a filter from the set of filters, and wherein each merged group comprises one or more classes that are mapped to a same set of filter coefficient information; determine the number of merged groups for the plurality of classes is equal to one, indicating that the plurality of classes includes one merged group; generate, for inclusion in the video data, a first flag set to a first value, wherein the first value for the first flag indicates that filter coefficient information for at least one of the merged groups is not coded in the video data and a second value for the first flag indicates that filter coefficient information for all of the merged groups is coded in the video data; and generate, for inclusion in the video data, a second flag set to a second value, wherein a first value for the second flag indicates that filter coefficient information mapped to the one merged group is coded in the video data, and wherein the second value for the second flag indicates that the filter coefficient information mapped to the one merged group is all zero values.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 3A-3C are conceptual diagrams illustrating example filter shapes.

DETAILED DESCRIPTION

Figure 1:
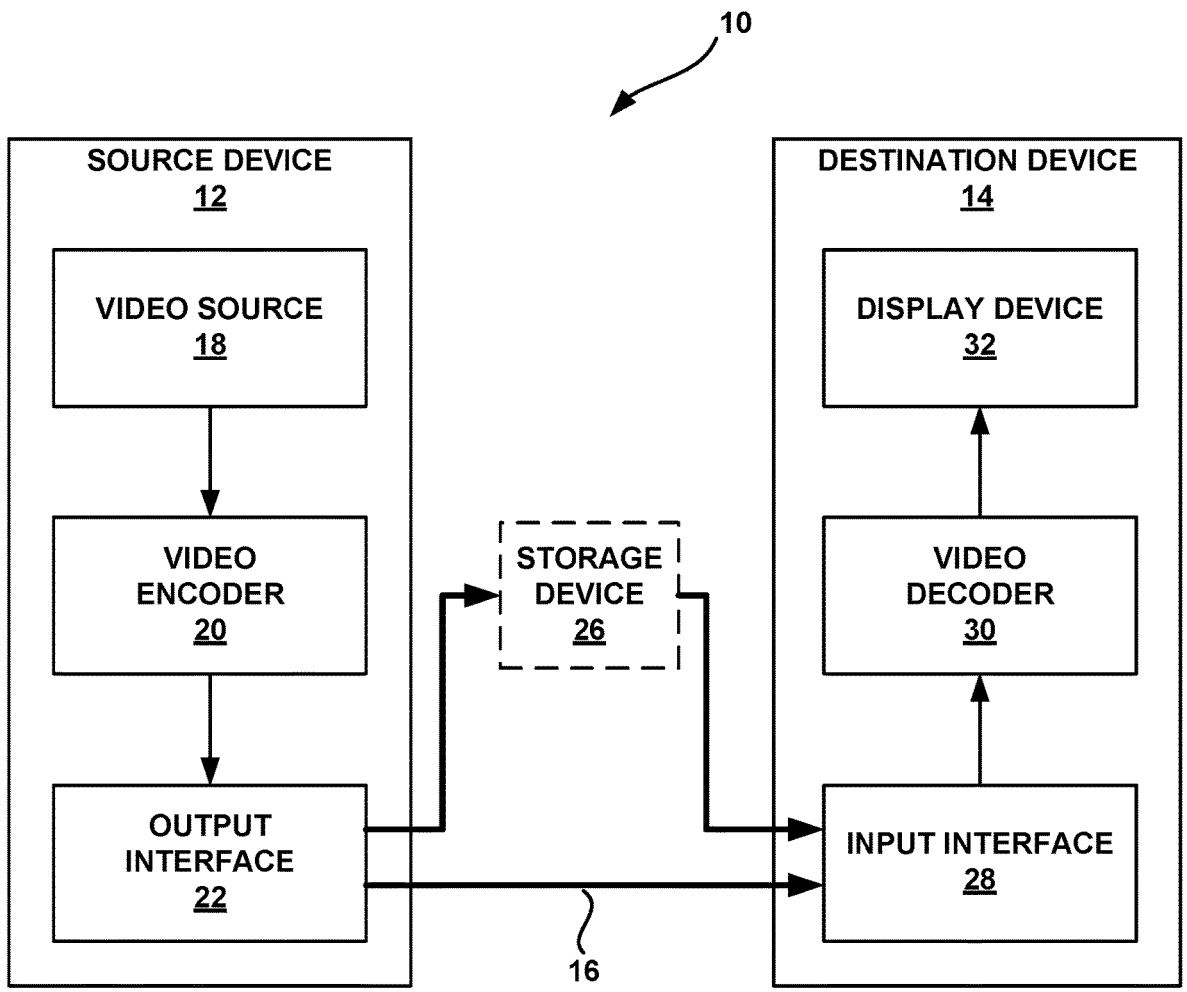
FIG. 1 is a block diagram illustrating an example video encoding and decoding system that may utilize the techniques described in this disclosure.

Video coding typically involves predicting a block of video data from either an already coded block of video data in the same picture (i.e. intra prediction) or an already coded block of video data in a different picture (i.e. inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques associated with filtering reconstructed video data in a video encoding and/or video decoding processes and, more particularly, this disclosure describes techniques related to ALF. The described techniques, however, may also be applied to other filtering schemes, such as other types of loop filtering, that require explicitly signaling of filter parameters. In accordance with this disclosure, filtering is applied at an encoder, and filter information is encoded in the bitstream to enable a decoder to identify the filtering that was applied at the encoder. The video encoder may test several different filtering scenarios, and based on, for example, a rate-distortion analysis, choose a filter or set of filters that produces a desired tradeoff between reconstructed video quality and compression quality. The video decoder either receives encoded video data that includes the filter information or implicitly derives the filter information, decodes the video data, and applies filtering based on the filtering information. In this way, the video decoder applies the same filtering that was applied at the video encoder.

This disclosure describes techniques related to ALF, especially for coding the side information, e.g., the filter parameters, for transmitting the filters. The techniques described herein may be used with advanced video codecs, such as extensions of HEVC or the next generation of video coding standards.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoder typically perform video decoding as part of the processes of determining how to encode video data.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

ITU-T VCEG (Q6/16) and ISO/IEC MPEG (JTC 1/SC 29/WG 11) are now studying the potential need for standardization of future video coding technology with a compression capability that potentially exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B 1001, San Diego, March 2016, which description is incorporated herein by reference.

In HEVC and other video coding specifications, a video sequence typically includes a series of pictures. Pictures may also be referred to as "frames." In one example approach, a picture may include three sample arrays, denoted SL, SCb, and Scr. In such an example approach, SL is a two-dimensional array (i.e., a block) of luma samples. SCb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the field of video coding, it is common to apply filtering in order to enhance the quality of a decoded video signal. The filter can be applied as a post-filter, where the filtered frame is not used for prediction of future frames or as an in-loop filter, where the filtered frame is used to predict future frames. A filter can be designed, for example, by minimizing the error between the original signal and the decoded filtered signal. Similarly, to transform coefficients the coefficients of the filter h(k,l), k=−K, . . . , K, l=−K, . . . K may be quantized according to the following formula, $$f(k,l)=\text{round}(\text{normFactor} \cdot h(k,l)),$$

coded, and sent to the decoder. The normFactor may, for example, be set equal to $2^n$. A larger the value of normFactor typically leads to a more precise quantization, and the quantized filter coefficients f(k,l) typically provide better performance. On the other hand, larger values of normFactor also typically produce coefficients f(k,l) that require more bits to transmit.

At video decoder 30, the decoded filter coefficients f(k,l) are applied to the reconstructed image R(i,j) as follows $$\tilde{R}(i,j) = \sum_{k=-K}^{K} \sum_{l=-K}^{K} f(k,l) R(i+k, j+l) \bigg/ \sum_{k=-k}^{K} \sum_{l=-K}^{K} f(k,l), \quad (1)$$

where i and j are the coordinates of the pixels within the frame.

The in-loop adaptive loop filter employed in JEM was originally proposed in J. Chen, Y. Chen, M. Karczewicz, X. Li, H. Liu, L. Zhang, X. Zhao, "Coding tools investigation for next generation video coding", SG16-Geneva-C806, January 2015, the description of which is incorporated herein by reference. ALF was proposed in HEVC, and was included in various working drafts and test model software, i.e., the HEVC Test Model (or "HM"), although ALF was not included in the final version of HEVC. Among the related technologies, the ALF design in the HEVC test model version HM-3.0 was claimed as the most efficient design. (See T. Wiegand, B. Bross, W. J. Han, J. R. Ohm and G. J. Sullivan, "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011, hereinafter "Working Draft 3", the entire contents of which are incorporated herein by reference). Therefore, the ALF design from HM-3.0 is introduced herein.

The version of ALF included in HM-3.0 is based on picture level optimization. That is, the ALF coefficients are derived after a whole frame is coded. There were two modes for the luma component, referred to as block based adaptation (BA) and region based adaptation (RA). These two modes share the same filter shapes, filtering operations, as well as the same syntax elements. One difference between BA and RA is the classification method, where classification generally refers to classifying a pixel or block of pixels so as to determine which filter from a set of filters to apply to the pixel or block of pixels.

In one example approach, the classification in BA is at a block level. For the luma component, 4×4 blocks in the whole picture are classified based on one-dimensional (1D) Laplacian direction (e.g., up to 3 directions) and two-dimensional (2D) Laplacian activity (e.g., up to 5 activity values). In one example approach, each 4×4 block in a picture is assigned a group index based on one-dimensional (1D) Laplacian direction and two-dimensional (2D) Laplacian activity. One example calculation of direction $\text{Dir}_b$ and unquantized activity $\text{Act}_b$ is shown in equations (2)-(5) below, where $\hat{I}_{i,j}$ indicates a reconstructed pixel with relative coordinate (i,j) to the top-left pixel position of a 4×4 block, $V_{i,j}$ and $H_{i,j}$ are the absolute values of vertical and horizontal gradient of the pixel located at (i,j). As such, direction $\text{Dir}_b$ is generated by comparing the absolute values of the vertical gradient and the horizontal gradient in the 4×4 block and $\text{Act}_b$ is the sum of the gradients in both directions in the 4×4 block. $\text{Act}_b$ is further quantized to the range of 0 to 4, inclusive, as described in the "WD3: Working Draft 3 of High-Efficiency Video Coding" document discussed above.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i-1,j} - \hat{I}_{i+1,j}| \quad (3)$$

$$\text{Dir}_b = \begin{cases} 1, \text{ if } \left(\sum_{i=0}^{3}\sum_{j=0}^{3} H_{i,j} > 2 \times \sum_{i=0}^{3}\sum_{j=0}^{3} V_{i,j}\right) \\ 2, \text{ if } \left(\sum_{i=0}^{3}\sum_{j=0}^{3} V_{i,j} > 2 \times \sum_{i=0}^{3}\sum_{j=0}^{3} H_{i,j}\right) \\ 0, \text{ otherwise} \end{cases} \quad (4)$$

$$\text{Act}_b = \sum_{i=0}^{3}\sum_{j=0}^{3} \left(\sum_{m=i-1}^{i+1}\sum_{n=j-1}^{j+1} (V_{m,n} + H_{m,n})\right) \quad (5)$$

In one example approach, therefore, each block can be categorized into one out of fifteen (5×3) groups (i.e., classes as follows). An index is assigned to each 4×4 block according to the value of $\text{Dir}_b$ and $\text{Act}_b$ of the block. Denote the group index by C and set C equal to $5\text{Dir}_b+A$ where A is the quantized value of $\text{Act}_b$. Therefore, up to fifteen sets of ALF parameters could be signaled for the luma component of a picture. To save the signaling cost, the groups may be merged along group index value. For each merged group, a set of ALF coefficients is signaled.

Figure 2:
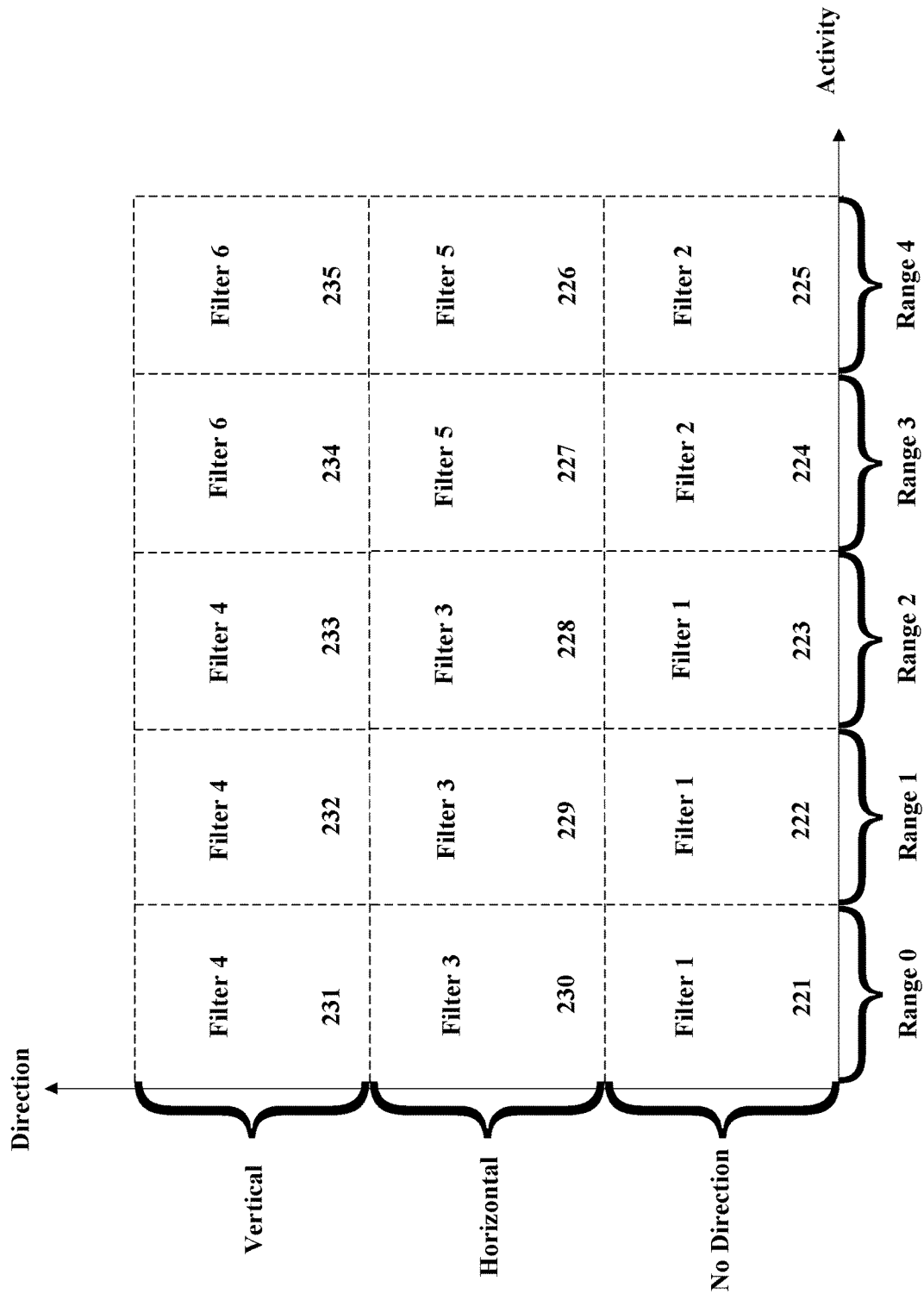
FIG. 2 is a conceptual diagram illustrating a mapping of ranges for an activity metric and a direction metric to filters.

FIG. 2 is a conceptual diagram illustrating these 15 groups (also referred to as classes) used for BA classification. In the example of FIG. 2, filters are mapped to ranges of values for an activity metric (i.e., Range 0 to Range 4) and a direction metric. The direction metric in FIG. 2 is shown as having values of No Direction, Horizontal, and Vertical, which may correspond to the values of 0, 1, and 2 above from equation 4. The particular example of FIG. 2 shows six different filters (i.e. Filter 1, Filter 2 . . . Filter 6) as being mapped to the 15 categories, but more or fewer filters may similarly be used. Although FIG. 2 shows an example, with 15 groups, identified as groups 221 through 235, more or fewer groups may also be used. For example, instead of five ranges for the activity metric more or fewer ranges may be used resulting in more groups. Additionally, instead of only three directions, additional or alternative directions (e.g. a 45-degree direction and 135-degree direction) may also be used.

As will be explained in greater detail below, the filters associated with each group of blocks may be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g. one of a horizontal or vertical neighbor), and if that flag is false, a second flag may be sent to indicate if the group is mapped to a second neighboring block (e.g. the other of the horizontal neighbor or the vertical neighbor).

Classes may be grouped into what are called merged groups, where each class in the merged group maps to the same filter. Referring to FIG. 2 as an example, groups 221, 222, and 223 may be grouped into a first merged group; groups 224 and 225 may be grouped into a second merged group, and so on. Typically, not all classes mapped to a certain filter need to be in the same merged group, but all classes in the merged group need to be mapped to the same filter. In other words, two merged groups may map to the same filter.

Filter coefficients may be defined or selected in order to promote desirable levels of video block filtering that can reduce blockiness and/or otherwise improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×7 is an example of a second shape, and 5×5 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

Figures 3A, 3B, 3C:
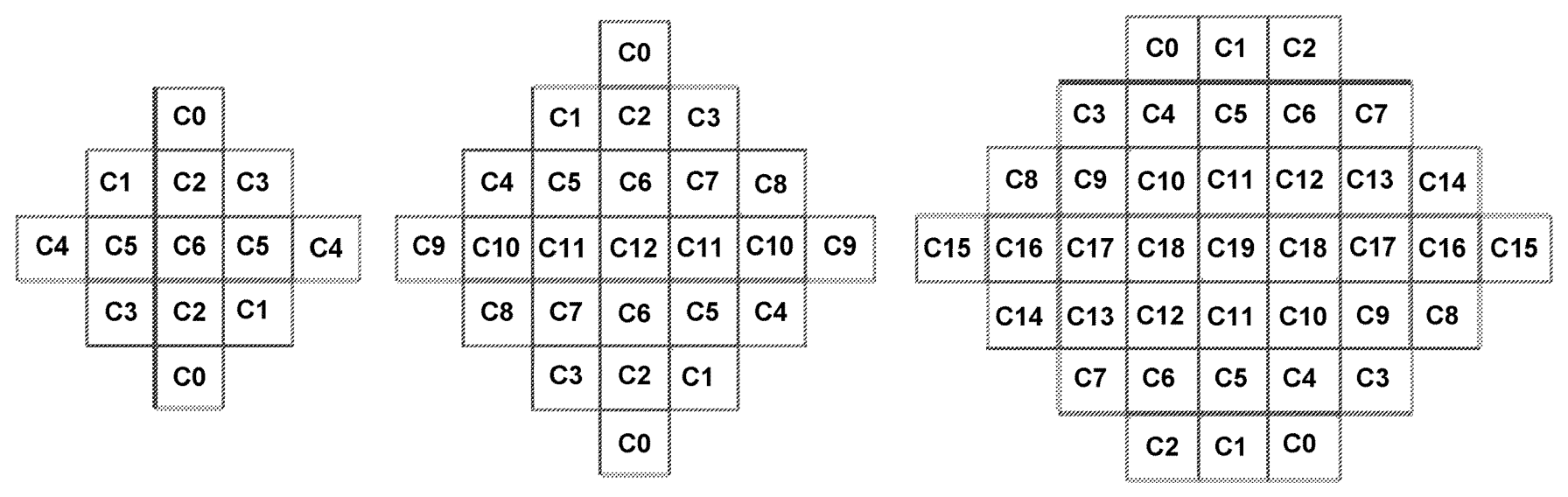

In one example approach, up to three circular symmetric filter shapes are supported. In one such example approach, the three filter shapes are the ones shown in FIGS. 3A-3C. In the examples shown, FIG. 3A illustrates a 5×5 diamond; FIG. 3B illustrates a 7×7 diamond; and FIG. 3C illustrates a truncated 9×9 diamond. The examples in FIGS. 3A-3C are diamond shapes however other shapes may be used. In most common cases, regardless of the shape of the filter, the center pixel in the filter mask is the pixel that is being filtered. In other examples, the filtered pixel may be offset from the center of the filter mask.

In one example approach, a single set of ALF coefficients is applied to each of the chroma components in a picture. In one such approach, the 5×5 diamond shape filter may always be used.

In such an example, video decoder 30 may filter each pixel sample $\hat{I}_{i,j}$ to become $I'_{i,j}$ based on the calculations as shown in equation (6) below, where L denotes filter length, $f_{m,n}$ represents filter coefficient, and o indicates filter offset or DC coefficient.

$$I'_{i,j} = \sum_{m=-L}^{L}\sum_{n=-L}^{L} f_{m,n} \times \hat{I}_{i+m,j+n} + o \quad (6)$$

In one example approach, only one filter is supported for two chroma components.

In one example approach, the total number of filters (or the total number of merged groups) is first signaled, from video encoder 20 to video decoder 30, when ALF is enabled for a slice. In some implementations, such signaling may only be necessary for the luma component because the chroma component only has one associated filter. In other implementations, such signaling may be included for both luma and chroma components. A filter support index of the number of (e.g., three) supported filter shapes may also be signaled indicating the selected filter shape. In some examples, all filters in a set of filters have the same shape.

Video decoder 30 may also receive information for assigning filter indexes to classes. Classes which have non-consecutive values of C may be merged, meaning those classes are mapped to the same filter. As one example, referring to FIG. 2, depending on a scan order used, each class may receive one or more of a merge left flag, a merge right flag, a merge up flag, or a merge down flag. By coding one flag for each class to indicate if the class is merged or not, the filter index may be derived by video decoder 30. For example, for each class, video decoder 30 may receive a flag. If the flag is a first value, then video decoder 30 can map the class to the same filter index used for the previous class. If the flag is a second value, then video decoder 30 can determine that the class maps to a different filter index and derive that filter index. Video decoder 30 may, for example, derive that the new filter index is one greater or one less than the filter index of the previous class.

In one example, video decoder 30 may receive a froce-Coeff0 flag to indicate whether at least one of the filters should not be coded, meaning values for the filter coefficients are not explicitly coded in the bitstream. When froceCoeff0 flag is equal 0, all of the filters should be coded, meaning video decoder 30 receives the coefficients in the bitstream, for example either as actual values or as differences between the actual values and predictor values. When froceCoeff0 flag is equal to 1, an additional flag (denoted by CodedVarBin) may be coded for each merged group to indicate if the filter should be signaled or not. When the filter is not signaled, then video decoder 30 sets all of the filter coefficients associated with the filter equal to 0. Typically, when there is only one filter after merging, or in other words there is only one merged group, the froceCoeff0 flag is not signaled.

When multiple filters for multiple merged groups need to be signaled, different methods may be used. In a first example, all the filters may be coded directly into the filter information. In this example, the values of filter coefficients may be encoded into the bitstream without using any predictive encoding techniques. In another example, the filter coefficients of the first filter may be directly coded, while the remaining filters are predictively coded into the filter information. In this case, the values of filter coefficients may be defined by residual values or differences relative to the filter coefficients associated with a previously coded filter. The previously coded filter may be the most recently coded filter, such that the filter indices of the current filter and the filter being used as a predictor are consecutive. In one example, to indicate the usage of one of the above two methods, one flag may be coded when the number of merged groups is larger than 1 and froceCoeff0 is equal to 0.

Figure 4:
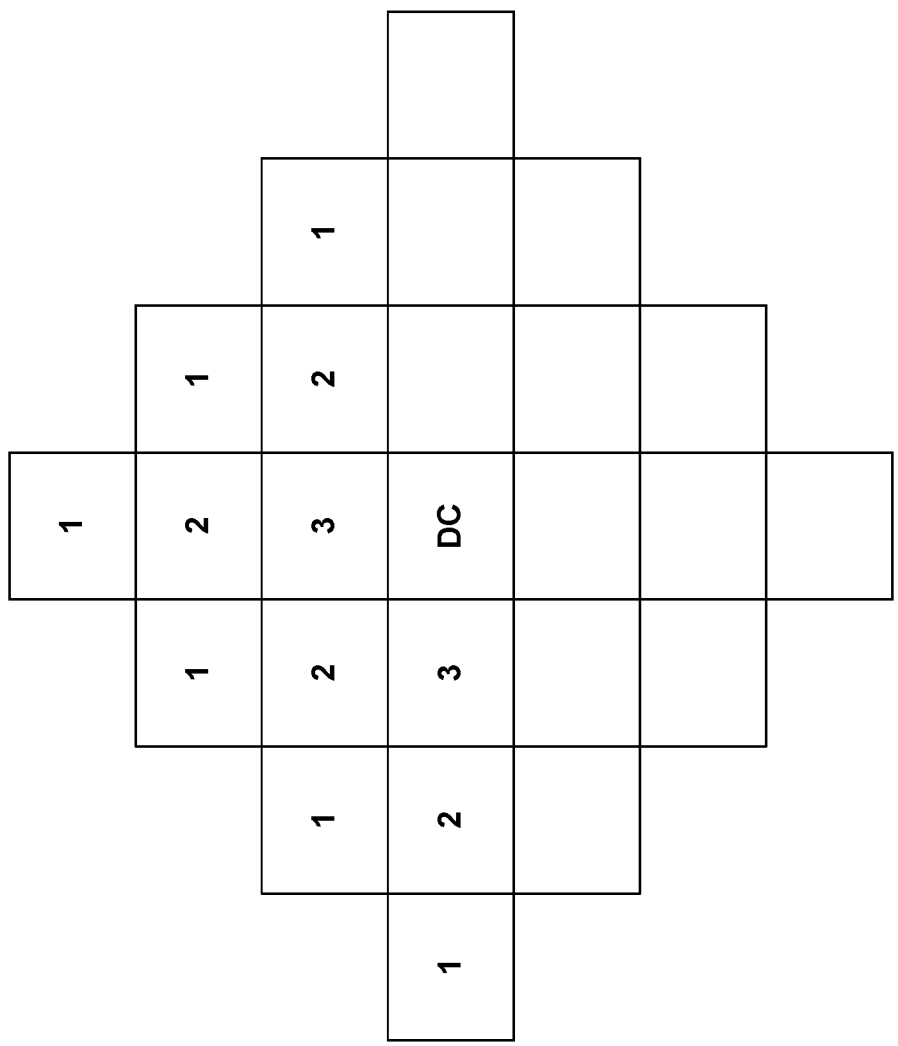
FIG. 4 shows an example of a 7×7 filter shape with 3 categories for filter coefficients signaling.

FIG. 4 illustrates Golomb encoding of filter coefficients. In the example shown in FIG. 4, one filter support is split into multiple categories. In the example shown, a 7×7 diamond filter shape has three categories. Each square denotes one filter coefficient Squares with the same number are coded with the same Golomb parameter.

In one such example approach, the signaling of filter coefficients includes two parts: Golomb parameters and coefficients. For the Golomb parameters, in one example approach, one value of a Golomb parameter (denoted by kMin) is firstly signaled, followed by a one bit flag for each category. The one bit flag indicates whether the parameter of category i (i from 1 to 3, inclusive, for 7×7 diamond symmetric filter support) is the same or increased by 1 compared to the Golomb parameter used for the previous category (i−1) when i is larger than 1; or compared to kMin when i is equal to 1. Based on the selected Golomb parameters, the absolute values of coefficients are then coded followed by the sign flag.

Temporal prediction may also be utilized for predicting filter coefficients. In one example approach, the ALF coefficients of reference pictures are stored and allowed to be reused as ALF coefficients of a current picture. For a current picture, a video coder may choose to use ALF coefficients stored for the reference pictures and bypass the signaling of new ALF coefficients. In this case, only an index to one of the reference pictures is signaled, and the stored ALF coefficients of the indicated reference picture are simply inherited for the current picture. In one such example approach, to indicate the usage of temporal prediction, one flag is firstly coded before sending the index. In some examples, the ALF coefficients associated with a previously coded picture which is not a reference picture of the current picture may also be utilized in ALF temporal prediction.

Geometric transformation-based adaptive loop filtering (GALF) will be discussed next. In GALF, the classification is modified with the diagonal gradients taken into consideration and geometric transformations may be applied to filter coefficients. GALF is described in M. Karczewicz, L. Zhang, W.-J. Chien, X. Li, "Improvements on adaptive loop filter", Exploration Team (JVET) of ITU-T SG 16 WP 3 and ISO/IEC JTC 1/SC 29/WG 11, Doc. JVET-B0060_r1, 2nd Meeting: San Diego, USA, 20-26 Feb. 2016, the description of which is incorporated herein by reference.

In one example approach, each 2×2 block is categorized into one of 25 classes (C) based on its directionality and quantized value of activity (A), as follows:

$$C = 5D + A \tag{7}$$

Values of the horizontal, vertical and two diagonal gradients are calculated using 1-D Laplacian:

$$g_v = \sum_{k=i-2}^{i+3} \sum_{l=j-2}^{j+3} V_{k,l}, \; V_{k,l} = |2R(k,l) - R(k,l-1) - R(k,l+1)|, \tag{8}$$

$$g_h = \sum_{k=i-2}^{i+3} \sum_{l=j-2}^{j+3} H_{k,l}, \; H_{k,l} = |2R(k,l) - R(k-1,l) - R(k+1,l)|, \tag{9}$$

$$g_{d1} = \sum_{k=i-2}^{i+3} \sum_{l=j-3}^{j+3} D1_{k,l}, \tag{10}$$

$$D1_{k,l} = |2R(k,l) - R(k-1,l-1) - R(k+1,l+1)|$$

$$g_{d2} = \sum_{k=i-2}^{i+3} \sum_{l=j-2}^{j+3} D2_{k,l}, \tag{11}$$

$$D2_{k,l} = |2R(k,l) - R(k-1,l+1) - R(k+1,l-1)|$$

Indices i and j refer to the coordinates of the upper left pixel in the 2×2 block. To assign the directionality D, ratio of maximum and minimum of the horizontal and vertical gradients $$g_{h,v}^{max} = \max(g_h, g_v), g_{h,v}^{min} = \min(g_h, g_v), \quad (12)$$

and the ratio of maximum and minimum of two diagonal gradients $$g_{d0,d1}^{max} = \max(g_{d0}, g_{d1}), g_{d0,d1}^{min} = \min(g_{d0}, g_{d1}), \quad (13)$$

are compared against each other and with set of thresholds $t_1$ and $t_2$:
Step 1. If both $g_{h,v}^{max} \leq t_1 \cdot g_{h,v}^{min}$ and $g_{d0,d1}^{max} \leq t_1 \cdot g_{d0,d1}^{min}$, D is set to 0.
Step 2. If $g_{h,v}^{max}/g_{h,v}^{min} > g_{d0,d1}^{max}/g_{d0,d1}^{min}$ continue from Step 3, otherwise continue from Step 4.
Step 3. If $g_{h,v}^{max} > t_2 \cdot g_{h,v}^{min}$, D is set to 2, otherwise D is set to 1.
Step 4. If $g_{d0,d1}^{max} > t_2 \cdot g_{d0,d1}^{min}$, D is set to 4, otherwise D is set to 3.
The activity value A is calculated as:

$$A = \sum_{k=i-2}^{i+3} \sum_{l=j-2}^{j+3} (V_{k,l} + H_{k,l}). \quad 14)$$

A is further quantized to the range of 0 to 4 inclusively, and the quantized value is denoted as Â.

A video coder may perform geometric transformations of filter coefficients. Three geometric transformations, including diagonal, vertical flip and rotation are described below.

Diagonal: $f_D(k,l) = f(l,k)$,

Vertical flip: $f_V(k,l) = f(k, K-l-1)$,

Rotation: $f_R(k,l) = f(K-l-1, k)$. (15)

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f (k,l) depending on gradient values calculated for that block. The relationship between the transformation and the four gradients calculated using Eqns. 8-11 is described in Table 1.

TABLE 1

Mapping of the gradient calculated for one block and the transformations.

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

To improve coding efficiency when temporal prediction is not available (e.g., intra frames), a set of fixed filters (e.g., 16 fixed filters) may be assigned to each class. In this context, fixed filters refer to predefined filters known by both the video encoder and video decoder without additional signalling. To indicate the usage of the fixed filter, a flag for each class is signaled and, if required, the index of the chosen fixed filter is signaled. Even when the fixed filter is selected for a given class, the coefficients of the adaptive filter f(k,l) may still be sent for this class in which case the coefficients of the filter which will be applied to the reconstructed image are sum of both sets of coefficients. Number of classes can share the same coefficients f(k,l) signaled in the bitstream even if different fixed filters were chosen for them.

Three cases are defined for GALF. In the first case, none of the filters of the 25 classes are predicted from the fixed filter. In the second case, all filters of the classes are predicted from the fixed filter. In the third case, filters associated with some classes are predicted from fixed filters and filters associated with the rest of the classes are not predicted from the fixed filters. An index may be firstly coded to indicate one of the three cases. In addition, the following applies:

For case 1, there is no need to further signal the index of fixed filter;

Otherwise, for case 2, an index of the selected fixed filter for each class is signaled;

Otherwise (for case 3), one bit for each class is first signaled, and if a fixed filter is used, then the index is further signaled.

In one example approach, to reduce the number of bits required to represent the filter coefficients, different classes can be merged. However, unlike in the approach described in Wiegand, et al. above, any set of classes can be merged, even classes having non-consecutive values of C or non-neighboring classes. The information detailing the classes that are merged is provided by sending for each of the 25 classes an index $i_C$, where $i_C$ indicates the filter index assigned to the class. Classes having the same index $i_C$ share the same filter, e.g., same filter coefficients, same filter shape, etc. In one such approach, the index $i_C$ is coded with truncated fixed length method. In some example implementations of GALF, the filter coefficients that are coded may be the differences between the optimal derived filter coefficients and the predicted filter coefficients (e.g., a filter selected from fixed filters).

Similarly, in some example approaches, the forceCoef0 flag is also used. When the forceCoef0 flag is equal to 1, a one bit flag, denoted by CodedVarBin for each of the merged groups (all filters to be coded) is further signaled to indicate whether the signaled filter coefficients are all zero. Moreover, when this flag is equal to 1, the predictively coding, i.e., coding the difference between current filter and previously coded filter, is disabled. In GALF, the signaled filter coefficients may be the actual filter coefficients or filter coefficients differences.

It should be noted that when prediction from fixed filters is allowed, the filters to be signaled/coded mentioned above may be the differences between the filter applied to the reconstructed image and the selected fixed filter. In this case, different classes with the same $i_C$ may have the same filter coefficient differences. However, the filter applied to the reconstructed image may be different due to the different selected fixed filters. This disclosure may generally describe techniques for signaling filters. It should be understood, however, that unless stated otherwise, the filter(s) generally refer to filter coefficient information that may either be actual filter coefficient values or difference values between actual filters and predicted filters.

Other information, such as coefficients may be coded in the same way as, for example, in JEM2.0. Existing proposals for ALF/GALF designs may have some potential problems. As a first example, with current designs for ALF parameter signaling, multiple classes could be assigned to different filter indices while the coefficients of filters to be coded are all zero. In such a case, unnecessary bits may be wasted signaling the total number of filters/merged groups and for signaling filter indices for those classes. As a second example, when froceCoeff0 is equal to 1, predictive coding of the values of filter coefficients, i.e., residual values or differences relative to the filter coefficients associated with a most recent previously coded filter, may always be disabled which may reduce efficiency. As a third example, in current approaches, the Golomb parameter of one category are always the same or increased by 1 compared to the value of one previous category, based on the assumption that the values of coefficients are going up for categories with larger indices. However, when prediction from previously filter or fixed filter is enabled, such is not the case.

To resolve the problems mentioned above, following techniques are disclosed. The following techniques may be applied individually, or alternatively, in any combination. The following techniques may be applied by either video encoder 20 or video decoder 30. In some instances, video decoder 30 may perform a decoding process that is reciprocal to an encoding processing performed by video encoder 20. As one example, if video encoder 20 transmits certain information, then video decoder 30 may receive such information.

In the following discussion, when the filter coefficients of one filter to be coded (after potential prediction from fixed filters or previously coded filter) are all zero (with or without the DC coefficient), such a filter is named a zero filter.

This disclosure introduces techniques for coding scenarios when there are two or more filters after grouping. A video decoder may, for example, perform grouping by receiving filter indices for each class, with classes having the same filter index belonging to the same group. In one example technique for such a scenario, when the filters associated with multiple classes are Zero Filters, the filter indices (i.e., $i_C$ above) for these classes may be assigned to the same values. That is, these classes may be grouped together.

In one such example, for these classes, the filter index may be set to one given number, e.g., the largest filter index (the total number of filters or the total number of filters minus 1) or the smallest filter index. Furthermore, the signaling (e.g. transmitting and receiving in an encoded bitstream) of these filters may be skipped. Finally, the total number of filters may be defined as the total number of filters which are not Zero Filters plus 1 (if there is Zero Filter) or plus 0 (if there is no Zero Filter).

According to another example technique for such a scenario, when froceCoeff0 is equal to 1 (i.e., at least one Zero Filter for some merged group), predictive coding of the values of filter coefficients, i.e., residual values or differences relative to the filter coefficients associated with a previously coded filter may still be applied. In one example approach, a filter that is not a Zero Filter may be predicted from one or more of previously coded filters. In another example approach, a filter which is not a Zero Filter may only be predicted from one or more of previously coded filters which are not Zero Filters. In yet another example approach, the coefficients of the filter which will be applied to the reconstructed image may be a function of the signaled coefficients, the fixed filter coefficients and/or its previously coded filters. In one such example approach, the function is defined as the summation.

This disclosure also introduces techniques for coding scenarios when there is only one filter after grouping. In such a scenario, when the filter is a Zero Filter, the filter support information may not be coded. Moreover, when prediction from fixed filters is allowed, the filter support may be defined as the filter support of fixed filters.

In another example for such a scenario, when there is only one merged group, the froceCoeff0 flag which indicates whether at least one of the filters is a Zero Filter may still be signaled. That is, the case of one merged group and only one Zero Filter is allowed. For example, for a group of video blocks, video decoder 30 may determine a number of merged groups for a plurality of classes is equal to one, receive froceCoeff0 flag set to indicate that at least one filter from a set of filters for the group of blocks is not coded in the video data, and receive, in the video data, for the one merged group, CodedVarBin indicating that the filter mapped to the one merged group is an all zero filter.

In another example, when there is only one merged group and the filter is predicted from one of the fixed filters, in one example approach, the forceCoeff0 flag is signaled. Otherwise, when there is only one merged group and the filter is not predicted from one of the fixed filters, the signaling of forceCoeff0 flag may be skipped and the filter coefficients may be coded.

In one example approach, regardless of the total number of filters after grouping, the signaling of flags (CodedVarBin) that indicate all coefficients of one filter to be coded are zero may be removed and, instead, the values of these flags may be derived from the signaled filter indices. In one example, when the largest or smallest filter index is used for one class, the filter coefficients of the corresponding filter to be coded may be all zeros.

In one example approach, regardless of the total number of filters after grouping, instead of coding the index of filters for each class, code the class indices associated with each filter. In one such example approach, for each filter, the smallest class index that uses this filter is directly coded. For each of the remaining classes, if the class uses the same filter, the difference of class index compared to its previous class index is coded.

In another such example approach, a special value is coded to indicate all of the classes with the same filter have been coded. Alternatively, the total number of classes that use the same filter is coded.

In yet another example approach, a video coder switches between coding class indices for each filter and coding indices of filters for each class as needed. In one such example approach, a flag is signaled to indicate the selected one of the two methods. In another such approach, the flag may be dependent on the total number of filters to be signaled excluding the Zero Filters.

The signaling of Golomb parameters will be discussed next. In one example approach, when coding the filter coefficients, instead of coding a first Golomb parameter and one bit flag for the first category, the Golomb parameter of the first category is directly coded. In one example approach, the differences between the Golomb parameter for category i and (i−1) is further coded.

In one example approach, the differences of two Golomb parameters for consecutive categories may be larger than 1 or smaller than 0.

In one example approach, when coding the filter coefficients, instead of always keeping the Golomb parameters in the ascending order, the Golomb parameters may be increased or decreased compared to the Golomb parameter used for the previous category. In one such example approach, the range of Golomb parameter increments or decrements may be different for different categories. That is, the same coded/decode value which indicates the difference compared to its previous one may be mapped to different values for different categories. In another such example approach, one Golomb parameter, denoted by defaultG, is firstly signaled, followed by the differences between the Golomb parameter for one category and defaultG.

Predictive coding and filters for chroma components will be discussed next. In one example approach, for the filters to be signaled (after possible prediction from fixed filters), each one of them may select whether to use predictive coding or not. In one such example approach, a one bit flag may be firstly signaled to indicate whether at least one of the filters uses predictive coding. In addition, for each filter except the first one to be coded, one flag may be signaled to indicate the usage of predictive coding. Alternatively, the flag associated with each filter may be skipped based on certain conditions such as, for example, whether the filter associates one class that is not predicted from the fixed filter.

In one example approach, instead of always using the recent previously coded filter to predict a filter, that one filter may be predicted from one or more other previously coded filters which are not coded consecutively.

In one example approach, a filter may be predicted from multiple previously coded filters. And the predictor may be generated by a function of two or more previously coded filters.

In one example approach, when prediction from a previously coded filter is enabled, an index is used to indicate which one of the previously coded filters may be further signaled. Alternatively, in one example approach, the differences of filter indices of the current filter and its predicted filter may be signaled.

In one example approach, a different filter may be used for each chroma component. In one such example approach, two filters are signaled, and each filter is applied to one chroma component. In another such example approach, the filter of the second chroma component is predictively coded. In one such example approach, the differences of filter coefficients between the two filters are coded. In another such example approach, one flag is firstly signaled to indicate whether different color components should use the same or different filters.

In one example approach, the filter for chroma components is inherited from one of the filters for the luma component. The filter may, for example, be inherited per slice or per block. In one such example approach, the signaling of filter coefficients for the chroma components may be skipped. In one such example approach, the filter of class 0 for the luma component may be inherited by one or more of the chroma components. In another such example approach, the filter with smallest index used for the luma component is inherited by one or more of the chroma components.

Figure 5:
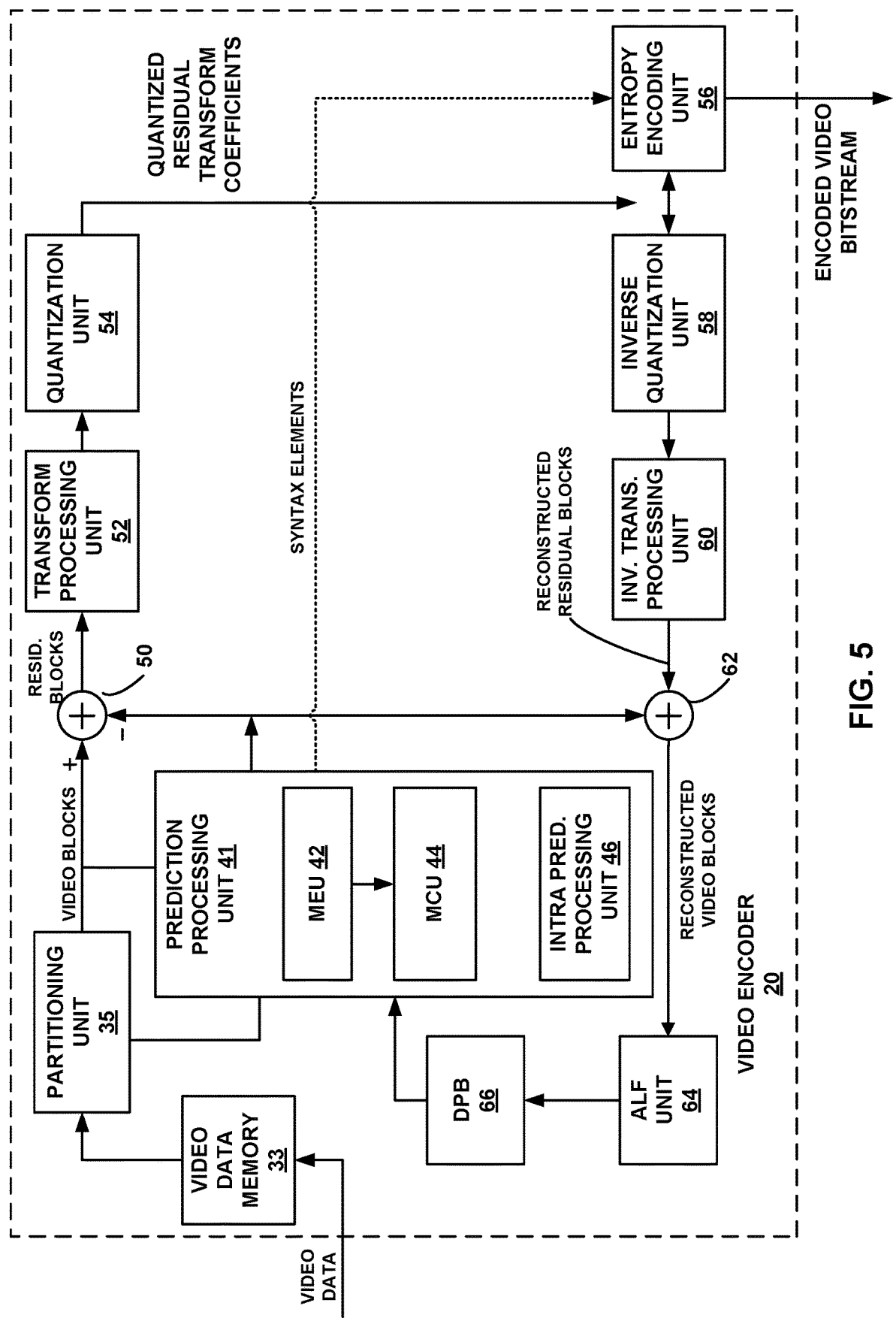
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 5, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, ALF unit 64, and decoded picture buffer (DPB) 66.

As shown in FIG. 5, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

ALF unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 5, video encoder 20 may include additional filters such as of a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

ALF unit 64 in conjunction with other components may be configured to perform various techniques described in this disclosure. ALF unit 64 may, for example, determine values for syntax elements, such as the syntax elements discussed above, and entropy encoding unit 56 may, for example, encode those syntax elements in a bitstream of encoded video data.

ALF unit 64 may also apply filtering to video blocks by determining, for an individual pixel, or for a sub-block (e.g., a 2×2, 4×4, or some other size sub-block), of the video block, values for one or more metrics, and based on the one or more metrics, determine a class for the pixel or sub-block. ALF unit 64 may, for example, determine the values for the metrics and the class using equations 2-5 or 7-14 described above. ALF unit 64 may then filter the pixel or sub-block using the filter, from the set of filters, mapped to the determined class.

Figure 6:
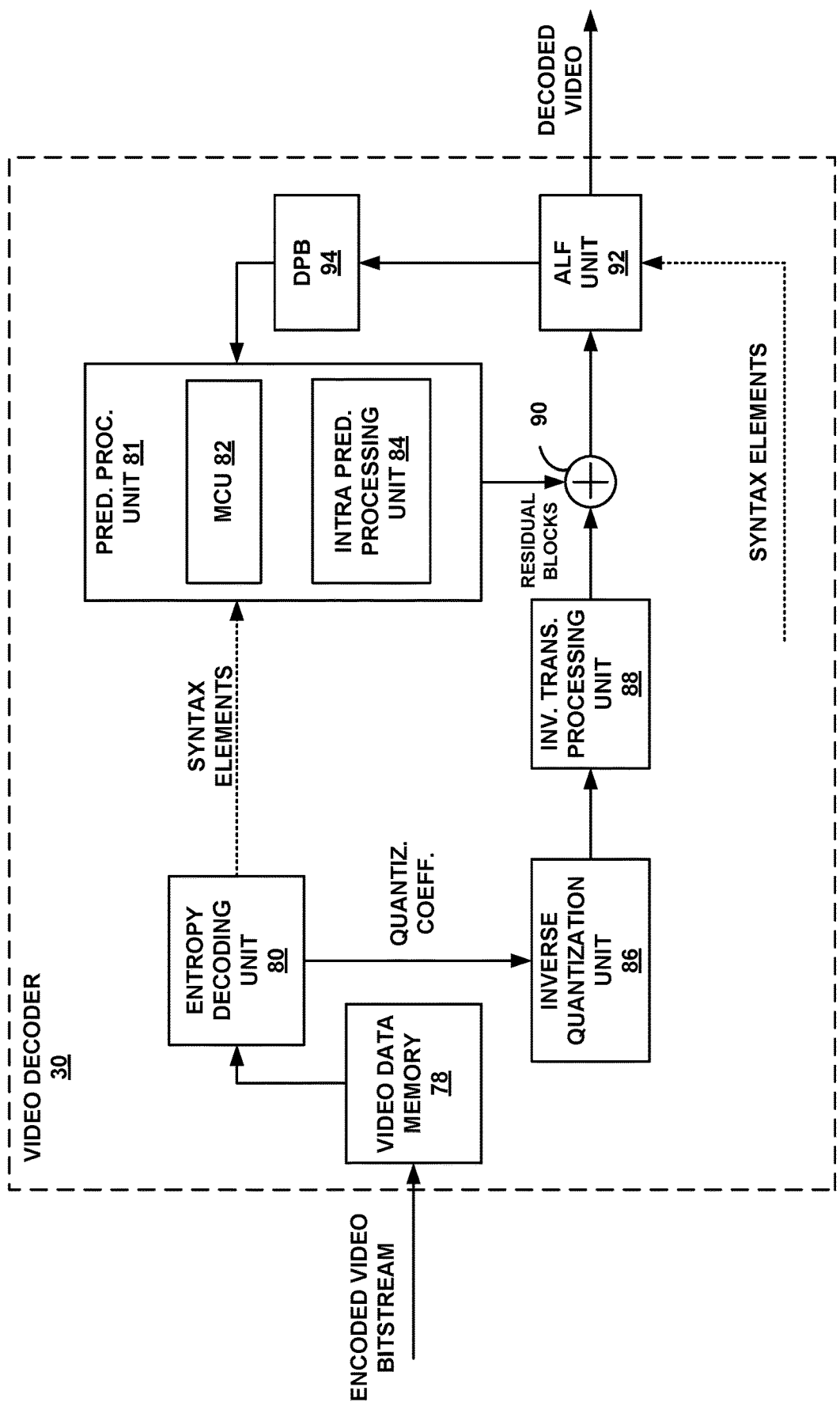
FIG. 6 is a block diagram illustrating an example video decoder that may implement the techniques described in this disclosure.

FIG. 6 is a block diagram illustrating an example video decoder 30 that may implement the techniques described in this disclosure. Video decoder 30 of FIG. 6 may, for example, be configured to receive the signaling described above with respect to video encoder 20 of FIG. 5. In the example of FIG. 6, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. ALF unit 92 filters the reconstructed video block using, for example, one or more of the ALF techniques described in this disclosure.

ALF unit 92 in conjunction with other components, such as entropy decoding unit 80 of video decoder 30 may be configured to perform the various techniques described in this disclosure. ALF unit 92 may, for example, receive syntax elements, such as the syntax elements discussed above, from entropy decoding unit 80 or elsewhere, and based on those syntax elements, determine a set of one or more filters.

ALF unit 92 may, for example, filter a video block by determining, for an individual pixel, or for a sub-block (e.g., a 2×2, 4×4, or some other size sub-block), of the video block, values for one or more metrics, and based on the one or more metrics, determine a class for the pixel or sub-block. ALF unit 92 may, for example, determine the values for the metrics and the class using equations 2-5 or 7-14 described above. ALF unit 92 may then filter the pixel or sub-block using the filter, from the set of filters, mapped to the determined class.

Although not explicitly shown in FIG. 6, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 7:
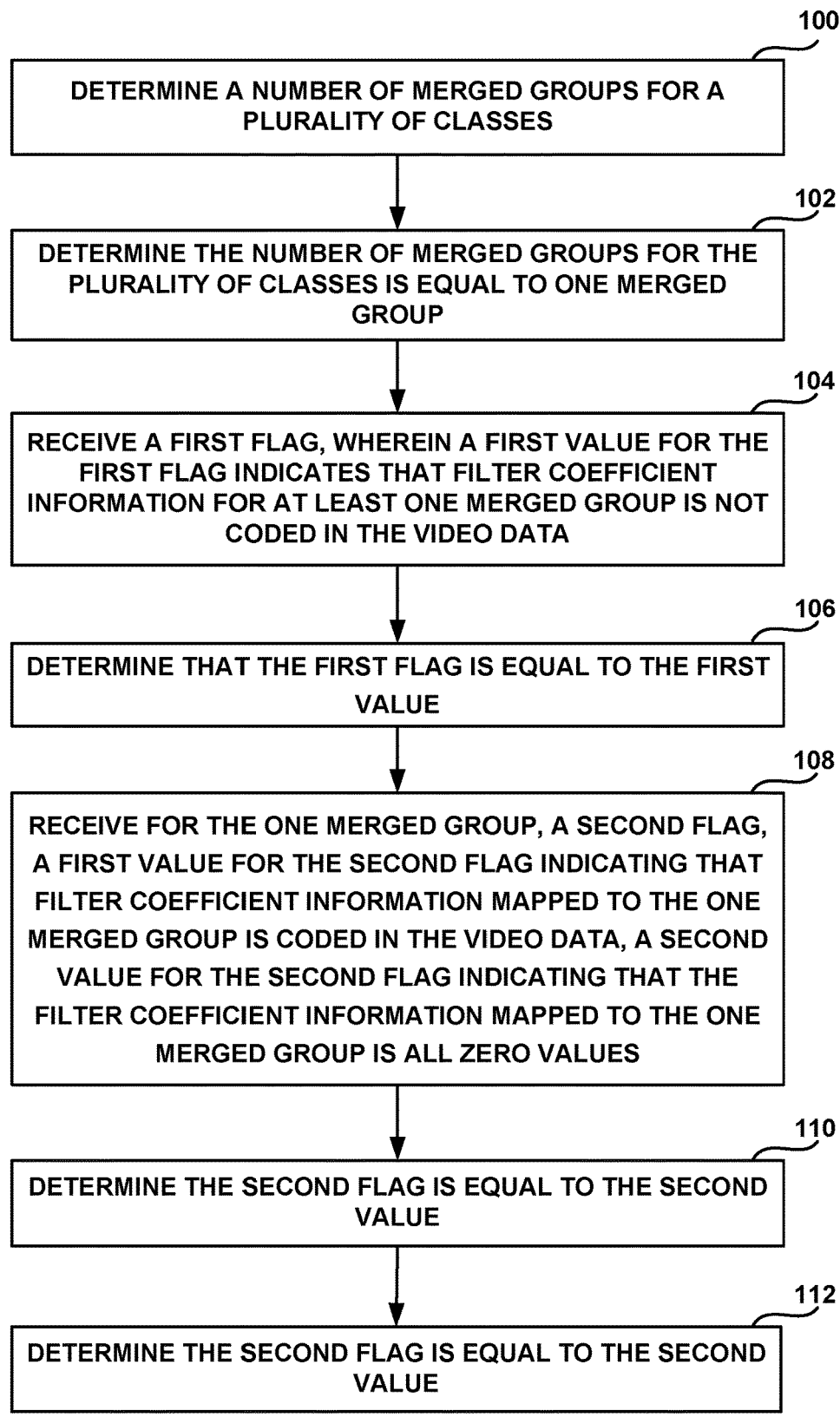
FIG. 7 is a flow diagram illustrating a technique for decoding video data in accordance with the techniques of this disclosure.

FIG. 7 is a flow diagram illustrating a technique for decoding video data in accordance with the techniques of this disclosure. The techniques of FIG. 7 may, for example, be performed by video decoder 30, although the techniques of FIG. 7 are not limited to any particular type of video decoder. In the example of FIG. 7, video decoder 30 determines, for a group of video blocks of the video data, a number of merged groups for a plurality of classes (100). The group of video blocks may, for example, be a slice of the video data, or may be all the blocks for which a certain parameter set, such as an SPS or PPS apply. The group of video blocks may also be sub-blocks of a larger block, such as CUs of an LCU. Each class of the plurality of classes has corresponding values for metrics, such as the metrics discussed above with respect to FIG. 2, and each class of the plurality of classes is mapped to a filter from a set of filters. Each merged group comprises one or more classes that are mapped to same filter coefficient information.

Video decoder 30 determines the number of merged groups for the plurality of classes is equal to one, indicating that the plurality of classes includes one merged group (102). To determine the number of merged groups for the plurality of classes is equal to one, video decoder 30 may, for example, receive, in the video data, syntax indicating a total number of filters in the set of filters is equal to one.

Video decoder receives, in the video data, for the group of video blocks, a first flag (e.g., the froceCoeff0 flag described above) (104). A first value for the first flag indicates that filter coefficient information for at least one of the merged groups is not coded in the video data, and a second value for the first flag indicates that filter coefficient information for all of the merged groups is coded in the video data. Video decoder 30 determines that the first flag is equal to the first value (106). Video decoder 30 receives, in the video data, for the one merged group, a second flag (e.g., the CodedVarBin flag described above) (108). A first value for the second flag indicates that filter coefficient information mapped to the one merged group is coded in the video data, and a second value for the second flag indicates that the filter coefficient information mapped to the one merged group is all zero values. Video decoder 30 determines the second flag is equal to the second value (110).

Video decoder 30 determines one or more filters from the set of filters using the all zero values (112). In some examples, the filter coefficient information mapped to the one merged group may be filter coefficient values. In such a case, the one or more filters from the set of filters includes at least one all zero filter where all the coefficients for the all zero filter are equal to zero. In other examples, the filter coefficient information mapped to the one merged group may be difference values. In such a case, the difference values are all equal to zero, and to determine the one or more filters from the set of filters using the all zero values, video decoder 30 may add the difference values to one or more predictive filters. In such an example, the set of filters may be the same as, or include, the one or more predictive filters. The one or more predictive filters may, for example, be one or more fixed filters.

For a second group of video blocks, video decoder 30 may determine that a number of merged groups for a plurality of classes is equal to one, indicating that the plurality of classes includes one merged group. In response to determining that the number of merged groups for the plurality of classes for the second group of video blocks is equal to one merged group for the second group of video blocks, video decoder 30 may receive, in the video data, for the second group of video blocks, a second instance of the first flag. Video decoder 30 may determine that the second instance of the first flag is equal to the second value, and video decoder 30 may skip receiving, in the video data, for the one merged group for the second group of video blocks, a second instance of the second flag. To skip receiving the second instance of the second flag, video decoder 30 may infer that the second instance of the second flag is equal to the first value without receiving the first values in the video data for the one merged group for the second group of video blocks. Video decoder 30 may receive, in the video data, filter coefficient information for the one merged group for the second group of video blocks, where the filter coefficient information for the one merged group for the second group of video blocks comprises at least one non-zero coefficient.

Figure 8:
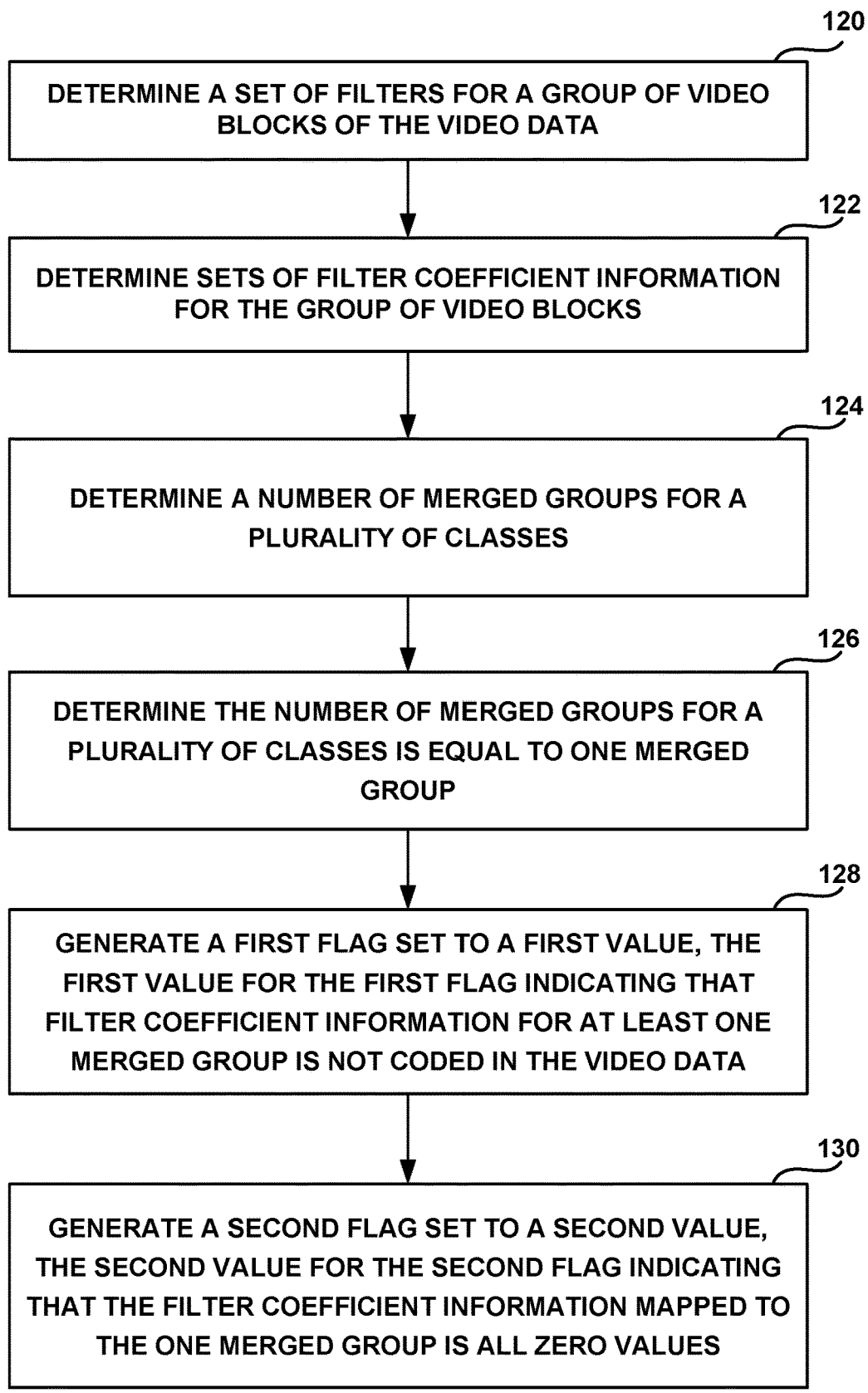
FIG. 8 is a flow diagram illustrating a technique for encoding video data in accordance with the techniques of this disclosure.

FIG. 8 is a flow diagram illustrating a technique for encoding video data in accordance with the techniques of this disclosure. The techniques of FIG. 8 may, for example, be performed by video encoder 20, although the techniques of FIG. 8 are not limited to any particular type of video encoder. In the example of FIG. 8, video encoder 20 determines a set of filters for a group of video blocks of the video data (120). The group of video blocks may, for example, be a slice of the video data, or may be all the blocks for which a certain parameter set, such as an SPS or PPS apply. The group of video blocks may also be sub-blocks of a larger block, such as CUs of an LCU.

Video encoder 20 determines sets of filter coefficient information for the group of video blocks (122). In some examples, the sets of filter coefficient information may be filter coefficient values, while in other examples, the sets of filter coefficient information may include difference values between filter coefficients of filters in the set of filters and filter coefficients of one or more predictive filters. the one or more predictive filters may, for example, be one or more fixed filters.

Video encoder 20 determines a number of merged groups for a plurality of classes (124). Each class of the plurality of classes has corresponding values for metrics, and each class of the plurality of classes is mapped to a filter from the set of filters. Each merged group includes one or more classes that are mapped to a same set of filter coefficient information. Video encoder 20 determines the number of merged groups for the plurality of classes is equal to one, indicating that the plurality of classes includes one merged group (126). Video encoder 20 generates, for inclusion in the video data, a first flag (e.g., the froceCoeff0 flag described above) set to a first value (128). A first value for the first flag indicates that filter coefficient information for at least one of the merged groups is not coded in the video data, and a second value for the first flag indicates that filter coefficient information for all of the merged groups is coded in the video data. Video encoder 20 generates, for inclusion in the video data, a second flag (e.g., the CodedVarBin flag described above) set to a second value (130. A first value for the second flag indicates that filter coefficient information mapped to the one merged group is coded in the video data, and the second value for the second flag indicates that the filter coefficient information mapped to the one merged group is all zero values.

For a second group of video blocks, video encoder 20 may determine that a number of merged groups for a plurality of classes for a second group of video blocks is equal to one merged group, and in response to determining that the number of merged groups for the plurality of classes for the second group of video blocks is equal to one merged group for the second group of video blocks, generate, for inclusion in the video data, for the second group of video blocks, a second instance of the first flag set to the second value without including in the video data for the one merged group for the second group of video blocks, a second instance of the second flag.

Figure 9:
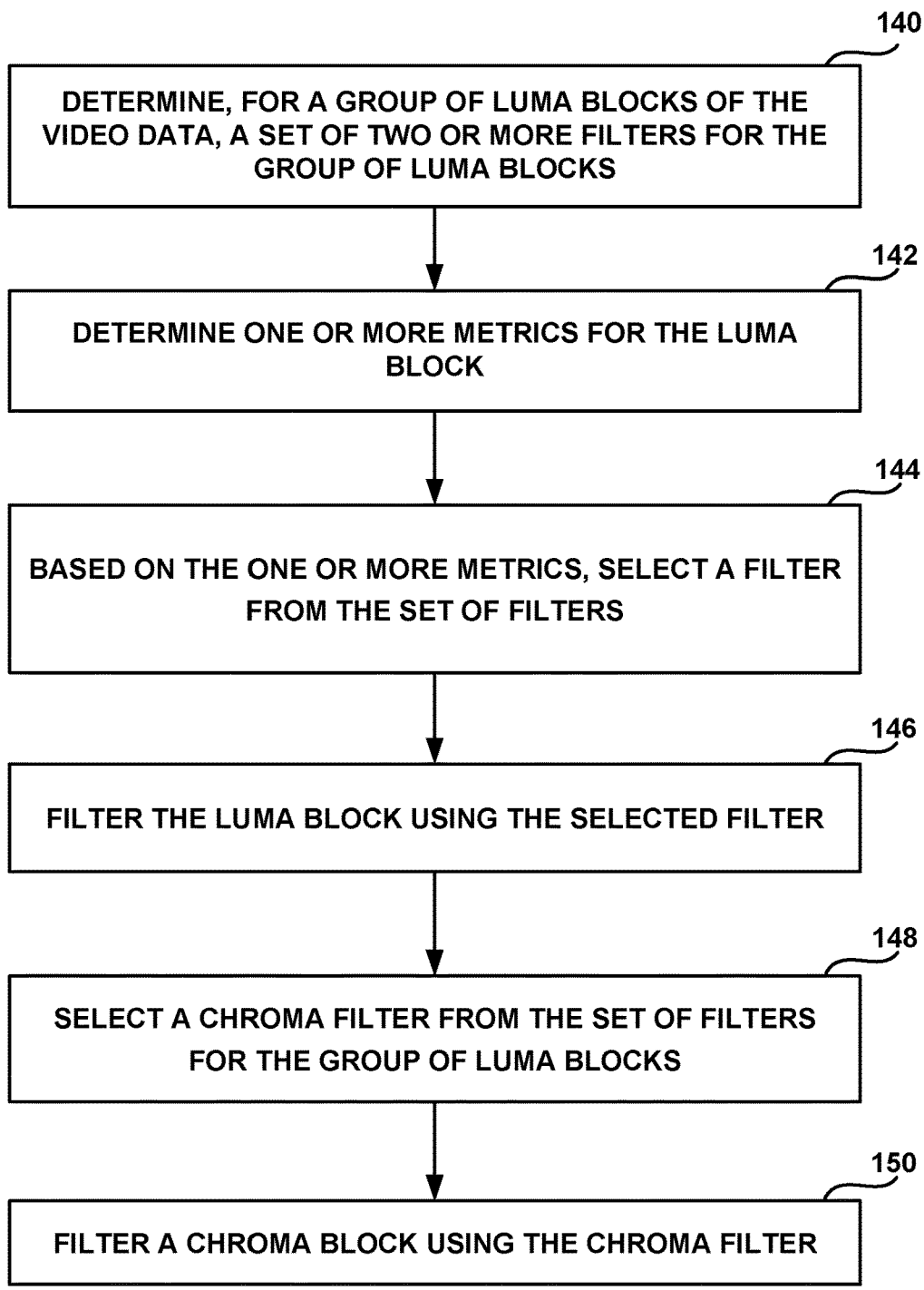
FIG. 9 is a flow diagram illustrating a technique for decoding video data in accordance with the techniques of this disclosure.

FIG. 9 is a flow diagram illustrating a technique for decoding video data in accordance with the techniques of this disclosure. The techniques of FIG. 9 may, for example, be performed by video decoder 30, although the techniques of FIG. 9 are not limited to any particular type of video decoder. In the example of FIG. 9, video decoder 30 determines, for a group of luma blocks of the video data, a set of two or more filters for the group of luma blocks (140). For a luma block from the group of luma blocks, video decoder 30 determines one or more metrics for the luma block (142). Based on the one or more metrics, video decoder 30 selects a filter from the set of filters (144). Video decoder 30 filters the luma block using the selected filter (146).

Video decoder 30 selects a chroma filter from the set of filters for the group of luma blocks (148). Video decoder 30 filters a chroma block using the chroma filter (150). Thus, by reusing a filter from the set of filters determined for the luma blocks, video decoder 30 potentially simplifies the filter derivation process for chroma blocks. In some examples, video decoder 30 may select a luma filter to be used for chroma filtering on a block-by-block basis, while in other examples, video decoder 30 may select a luma filter for chroma filtering on a slice-by-slice basis, or some other basis. In some examples, the selected luma filter may be the only filter (or only non-zero filter) available for filtering a chroma block.

In one example, each filter in the set of two or more filters is associated with one or more classes, and to select the chroma filter from the set of filters for the group of luma blocks, video decoder 30 determine a filter associated with a specific class and selects the filter associated with the specific class as the chroma filter. In another example, each filter in the set of two or more filters is associated with a filter index, and each filter index maps to one or more classes. To select the chroma filter from the set of filters for the group of luma blocks, video decoder 30 selects a filter associated with a smallest filter index as the chroma filter.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:

for a group of video blocks of the video data, determining a number of merged groups for a plurality of classes, wherein each class of the plurality of classes has corresponding values for metrics, wherein each class of the plurality of classes is mapped to a filter from a set of filters, and wherein each merged group comprises one or more classes that are mapped to same filter coefficient information;

determining the number of merged groups for the plurality of classes is equal to one, indicating that the plurality of classes includes one merged group;

receiving, in the video data, for the group of video blocks, a first flag, wherein a first value for the first flag indicates that filter coefficient information for at least one of the merged groups is not coded in the video data and a second value for the first flag indicates that filter coefficient information for all of the merged groups are coded in the video data;

determining that the first flag is equal to the first value;

receiving, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values;

determining the second flag is equal to the second value; and determining one or more filters from the set of filters using the all zero values.

2. The method of claim 1, wherein the filter coefficient information mapped to the one merged group comprises filter coefficient values, and wherein the one or more filters from the set of filters comprises an all zero filter, wherein all coefficients for the all zero filter are equal to zero.

3. The method of claim 1, wherein the filter coefficient information mapped to the one merged group comprises difference values, wherein the difference values are all equal to zero, and wherein determining the one or more filters from the set of filters using the all zero values comprises adding the difference values to one or more predictive filters, wherein the one or more filters from the set of filters comprises at least one filter with at least one non-zero coefficient.

4. The method of claim 3, wherein the one or more predictive filters comprise one or more fixed filters.

5. The method of claim 1, wherein determining the number of merged groups for the plurality of classes is equal to one comprises receiving, in the video data, syntax indicating a total number of filters in the set of filters is equal to one.

6. The method of claim 1, wherein the group of video blocks comprises a group of luma video blocks.

7. The method of claim 1, wherein the group of video blocks comprises a slice.

8. The method of claim 1, wherein the corresponding values for metrics comprises values for an activity metric and a value for a direction metric.

9. The method of claim 1, further comprising:
determining that a number of merged groups for a plurality of classes for a second group of video blocks is equal to one for the second group of video blocks;
in response to determining that the number of merged groups for the plurality of classes for the second group of video blocks is equal to one equal to one, indicating that the plurality of classes includes one merged group for the second group of video blocks, receiving, in the video data, for the second group of video blocks, a second instance of the first flag;
determining that the second instance of the first flag is equal to the second value for the first flag;
inferring, without receiving a second instance of the second flag in the video data, that the second instance of the second flag is equal to the first value for the second flag; and
receiving, in the video data, filter coefficient information for the one merged group for the second group of video blocks, wherein the filter coefficient information for the one merged group for the second group of video blocks comprises at least one non-zero coefficient.

10. A method for encoding video data, the method comprising:
determining a set of filters for a group of video blocks of the video data;
determining sets of filter coefficient information for the group of video blocks;
determining a number of merged groups for a plurality of classes, wherein each class of the plurality of classes has corresponding values for metrics, wherein each class of the plurality of classes is mapped to a filter from the set of filters, and wherein each merged group comprises one or more classes that are mapped to a same set of filter coefficient information;

determining the number of merged groups for the plurality of classes is equal to one, indicating that the plurality of classes includes one merged group;
generating, for inclusion in the video data, a first flag set to a first value, wherein the first value for the first flag indicates that filter coefficient information for at least one of the merged groups is not coded in the video data and a second value for the first flag indicates that filter coefficient information for all of the merged groups is coded in the video data;
generating, for inclusion in the video data, a second flag set to a second value, wherein a first value for the second flag indicates that filter coefficient information mapped to the one merged group is coded in the video data, and wherein the second value for the second flag indicates that the filter coefficient information mapped to the one merged group is all zero values.

11. The method of claim 10, wherein the sets of filter coefficient information comprise filter coefficient values, and wherein the set of filters comprises an all zero filter, wherein all coefficients for the all zero filter are equal to zero.

12. The method of claim 10, wherein the filter coefficient information comprises difference values between filter coefficients of filters in the set of filters and filter coefficients of one or more predictive filters.

13. The method of claim 12, wherein the one or more predictive filters comprise one or more fixed filters.

14. The method of claim 10, further comprising:
generating, for inclusion in the video data, syntax indicating that the number of merged groups for the plurality of classes is equal to one.

15. The method of claim 10, wherein the group of video blocks comprises a group of luma video blocks.

16. The method of claim 10, wherein the group of video blocks comprises a slice.

17. The method of claim 10, wherein the corresponding values for metrics comprises values for an activity metric and a value for a direction metric.

18. The method of claim 10, further comprising:
determining that a number of merged groups for a plurality of classes for a second group of video blocks is equal to one for the second group of video blocks;
in response to determining that the number of merged groups for the plurality of classes for the second group of video blocks is equal to one, indicating that the plurality of classes includes one merged group for the second group of video blocks, generating, for inclusion in the video data, for the second group of video blocks, a second instance of the first flag set to the second value without including in the video data for the one merged group for the second group of video blocks, a second instance of the second flag.

19. A device for decoding video data, the device comprising:
a memory configured to store the video data; and
one or more processors configured to:
for a group of video blocks of the video data, determine a number of merged groups for a plurality of classes, wherein each class of the plurality of classes has corresponding values for metrics, wherein each class of the plurality of classes is mapped to a filter from a set of filters, and wherein each merged group comprises one or more classes that are mapped to same filter coefficient information;

determine the number of merged groups for the plurality of classes is equal to one, indicating that the plurality of classes includes one merged group;

receive, in the video data, for the group of video blocks, a first flag, wherein a first value for the first flag indicates that filter coefficient information for at least one of the merged groups is not coded in the video data and a second value for the first flag indicates that filter coefficient information for all of the merged groups is coded in the video data;

determine that the first flag is equal to the first value;

receive, in the video data, for the one merged group, a second flag, wherein a first value for the second flag indicates that filter coefficient information mapped to the one merged group is coded in the video data, and wherein a second value for the second flag indicates that the filter coefficient information mapped to the one merged group is all zero values;

determine the second flag is equal to the second value; and determine one or more filters from the set of filters using the all zero values.

20. The device of claim 19, wherein the filter coefficient information mapped to the one merged group comprises filter coefficient values, and wherein the one or more filters from the set of filters comprises an all zero filter, wherein all coefficients for the all zero filter are equal to zero.

* * * * *